(12) United States Patent
Tong

(10) Patent No.: US 12,135,099 B2
(45) Date of Patent: Nov. 5, 2024

(54) FLOW AND PRESSURE CONTROL DEVICE

(71) Applicant: Lei Tong, Hong Kong SAR (CN)

(72) Inventor: Lei Tong, Hong Kong SAR (CN)

( * ) Notice: Subject to any disclaimer, the term of this patent is extended or adjusted under 35 U.S.C. 154(b) by 209 days.

(21) Appl. No.: 17/618,238

(22) PCT Filed: May 26, 2020

(86) PCT No.: PCT/CN2020/092394
§ 371 (c)(1),
(2) Date: Dec. 10, 2021

(87) PCT Pub. No.: WO2020/248814
PCT Pub. Date: Dec. 17, 2020

(65) Prior Publication Data
US 2022/0221065 A1 Jul. 14, 2022

(30) Foreign Application Priority Data
Jun. 11, 2019 (CN) .......................... 201910501850.2

(51) Int. Cl.
F16K 1/36 (2006.01)
F16K 5/06 (2006.01)
(52) U.S. Cl.
CPC ............. F16K 5/0605 (2013.01); F16K 1/36 (2013.01)
(58) Field of Classification Search
CPC ..................................... F16K 3/24; F16K 1/36
See application file for complete search history.

(56) References Cited

U.S. PATENT DOCUMENTS

| 199,814 A | 1/1878 | Fifield | |
| 1,243,454 A * | 10/1917 | Spaleck | F16K 7/10 138/46 |
| 7,347,408 B2 | 3/2008 | Keiser | |
| 9,599,243 B1 * | 3/2017 | Taylor | F16K 17/14 |

(Continued)

FOREIGN PATENT DOCUMENTS

| CN | 201462040 U | 5/2010 |
| CN | 101749788 A | 6/2010 |

(Continued)

OTHER PUBLICATIONS

Search Report from European Application No. 20822203.4 dated Oct. 28, 2022 (10 pages).

(Continued)

Primary Examiner — Michael R Reid
(74) Attorney, Agent, or Firm — Calfee, Halter & Griswold LLP

(57) ABSTRACT

A flow and pressure control device includes: a valve body, a flow limiting core and an adjustment device. The valve body includes: an outlet pipe, a transition cavity and an inlet pipe having a circular or elliptical cross section. The flow limiting core can be completely inserted into the inlet pipe, and blocks a fluid passage of the inlet pipe. An inclined and inwardly recessed surface is provided at an end portion of the flow limiting core. The adjustment device is used to adjust the depth by which the flow limiting core is inserted into the inlet pipe. An operating section of the flow and pressure control device is approximately circular or approximately elliptical or is a combination of a partially circular shape and a partially elliptical shape.

15 Claims, 6 Drawing Sheets

(56) References Cited

U.S. PATENT DOCUMENTS

| | | |
|---|---|---|
| 2006/0027779 A1 | 2/2006 | McGuire et al. |
| 2008/0017254 A1 | 1/2008 | Kaneko |
| 2013/0193363 A1* | 8/2013 | van den Eijkel ....... F16K 27/00 |
| | | 251/366 |
| 2015/0122353 A1 | 5/2015 | Chiba |

FOREIGN PATENT DOCUMENTS

| | | |
|---|---|---|
| CN | 103260844 A | 8/2013 |
| CN | 104132158 A | 11/2014 |
| CN | 107883019 A | 4/2018 |
| CN | 110206899 A | 9/2019 |
| GB | 2 085 128 A | 4/1982 |
| GB | 2 155 155 A | 9/1985 |
| JP | 2002 323157 A | 11/2002 |

OTHER PUBLICATIONS

Chinese Office Action dated May 8, 2020 for CN Application No. 201910501850.2 (14 pages including English translation).
English translation of International Search Report, mailed Jul. 24, 2020, issued in corresponding PCT application No. PCT/CN2020/092394, filed May 26, 2020.

* cited by examiner

FLOW AND PRESSURE CONTROL DEVICE

CROSS-REFERENCE TO RELATED APPLICATIONS

This application is a National Stage of International Application No. PCT/CN2020/092394, filed May 26, 2020, which claims priority to Chinese Patent Application No. 201910501850.2, filed Jun. 11, 2019, both of which are hereby incorporated by reference in their entireties.

TECHNICAL FIELD

The present application relates to the technical field of flow control and hydraulic transmission, and more particularly to a flow and pressure control device.

BACKGROUND ART

For a variety of solids, liquids and gas streams, a flow or flow rate control device in the prior art is mostly a ball valve, a needle valve or a gate valve, and the like. When a conventional ball valve is put through, a passage section of a flow control part is in the form of an olive shape, the length-height ratio of which can be increased or decreased, and it is round when opened to maximum; when a conventional needle valve is put through, a passage section of a flow control part is in the form of an annular ring, the ring width of which can be increased or decreased, and it is round when opened to maximum. The technical purpose of controlling the flow and the flow rate is realized by adjusting the real-time passage section area. A gate valve utilizes a change of opening and closing range of a movable door page to increase and decrease a sector section area size which materials can pass so as to realize flow rate control.

From the design principle, ring-shaped, fan-shaped or olive-shaped flow limiting section designs of various flow control valves in the prior art have a characteristic that a ratio of an inscribed circle diameter of a flow control section to the real-time section area is lower, which will increase flow resistance under working conditions of high viscosity and small pipe diameter (such as a situation of conveying high-viscosity fluid in small diameter pipe and the like) and this will lead to efficiency reducing and consumption increasing. Meanwhile, the accuracy, fault-tolerant capability and flow control stability of equipment and facilities will also be influenced by the existence of large difference in particle size of passes material (such as coarsely ground and crushed ores) or non-uniform fluid (such as crude oil pumping with sandstone slurry) or occasional large particle size impurities (such as hydraulic pipeline scraps or thermal combustion engine fuel/lubricating oil circuit impurities fouling and carbon deposits, dry deposition scraps of spraying raw materials, liquid and gas impurities and the like). Especially in the case of a small flow value or high precision flow control in the whole process, for example, in the spraying operation, the better fineness cannot be obtained due to this reason. The problems faced by the prior art also include the contradictions between requirements of micro-flow control technology and design limits, material and processing costs, durability and convenience. Some small-sized devices are even scrapped due to the failure of this type of components (such as ink drying and blocking of ink-jet printers).

Therefore, a technical solution which is more accurate in flow control and capable of effectively resisting to material unevenness and self-resistance interference or high damage tolerance has great practical value in production and application of various industries.

SUMMARY OF THE INVENTION

In view of the above analysis, the present application aims to provide a flow and pressure control device to solve the problem that the inscribed circle radius of a passage section of a conventional flow control valve is small and therefore not conducive to flow control and pressure transmission of an in homogeneous or a viscous fluid.

The purpose of the application is mainly realized by the following technical solution:

a flow and pressure control device comprises: a valve body, a flow limiting core and an adjustment device;

in the technical solution of the application, the valve body comprises: an outlet pipe, a transition cavity and an inlet pipe having a circular or elliptical cross section; the flow limiting core can be completely inserted into the inlet pipe, and blocks a fluid passage of the inlet pipe; an inclined and inwardly recessed surface is provided at an end portion of the flow limiting core; the adjustment device is used to adjust the depth by which the flow limiting core is inserted into the inlet pipe.

In the technical solution of the application, the inclined and inwardly recessed surface is symmetrical with respect to a first reference plane, which is a longitudinal symmetry plane of the valve body; the edge of the inclined and inwardly recessed surface and the first reference plane are intersected at a first reference point A and a second reference point B, wherein the first reference point A is the point in the inclined and inwardly recessed surface that last inserts into the inlet pipe, and the second reference point B is the point in the inclined and inwardly recessed surface that first inserts into the inlet pipe;

an inner edge of the end face of the inner wall of the inlet pipe intersects with the first reference plane at a third reference point H and a fourth reference point I; the third reference point H can coincide with the first reference point A, and the fourth reference point I can coincide with the second reference point B.

In the technical solution of the application, an angle α between a line segment AB connecting the first reference point A and the second reference point B and the fluid flowing direction of the axis of the inlet pipe is greater than 0° and less than 90°;

an angle β between a line HI connecting the third reference point H and the fourth reference point I and the fluid flowing direction of the axis of the inlet pipe is greater than 0° and less than or equal to 90°.

In the technical solution of the application, a straight line on the first reference plane passing through the third reference point H and perpendicular to the line segment AB intersects with the inclined and inwardly recessed surface at a fifth reference point G;

the first reference plane and the inclined and inwardly recessed surface are intersected at a curve segment AGB, and the curve segment AGB is an concave curve;

a second reference plane which passes through the third reference point H and is perpendicular to the line segment AB intersects with the edge of the inclined and inwardly recessed surface at a sixth reference point E and a seventh reference point F; the second reference plane and the inclined and inwardly recessed surface are intersected at a curve segment EGF, and the curve segment EGF is a concave curve.

In the technical solution of the application, the curve segment AGB is a circular arc;
when the angle α satisfies: 0°<α≤30°, the radius R of the curve segment AGB satisfies: R=D/(1−cos 2α), where D is the diameter of the flow limiting core;
when the angle α satisfies: 30°<α<90°, the radius R of the curve segment AGB satisfies: R=$L_{AB}$, where $L_{AB}$ is the length of the line segment AB.

In the technical solution of the application, the curve segment AGB is a part of a parabola, and satisfies:

$$H_1 = D(1 - \sqrt{(L-L_1)/L});$$

$H_1$ is the distance from the fifth reference point G to the straight line BI; D is the diameter of the flow limiting core; L is the length of the line segment AB projected in the axial direction of the flow limiting core, and the $L_1$ is distance of the second reference point B and the fifth reference point G projected in the axial direction of the flow limiting core.

In the technical solution of the application, the curve segment EGF is an elliptic arc and is symmetrical about major axis of the ellipse, satisfying the elliptic equation:

$$4x^2/D^2 + y^2/L_{GH}^2 = 1;$$

the plane where the ellipse equation is located is the second reference plane; the x axis of a rectangular coordinate system of the elliptic equation coincides with the straight line HG, and the coordinate origin coincides with the third reference point H; D is the diameter of the flow limiting core, and $L_{GH}$ is the length of line segment HG.

In the technical solution of the application, the curve segment EGF is a circular arc having a radius R satisfying: R=$L_{GH}$, wherein $L_{GH}$ is the length of the line segment HG.

In the technical solution of the application, the flow and pressure control device is a hot runner flow control valve of 3D printing equipment;
the curve segment AGB is part of a parabola and satisfies:

$$H_1 = D(1 - \sqrt{(L-L_1)/L});$$

$H_1$ is the distance from the fifth reference point G to the straight line BI; D is the diameter of the flow limiting core; L is the length of the line segment AB projected in the axial direction of the flow limiting core, and $L_1$ is the distance of the second reference point B and the fifth reference point G projected in the axial direction of the flow limiting core;
the curve segment EGF is an elliptic arc, satisfying the elliptic equation:

$$4x^2/D^2 + y^2/L_{GH}^2 = 1;$$

the plane where the ellipse equation is located is the second reference plane; the x axis of a rectangular coordinate system of the elliptic equation coincides with the straight line HG, and the coordinate origin coincides with the third reference point H; and $L_{GH}$ is the length of the line segment HG.

In the technical solution of the application, the flow and pressure control device a vehicle thermal gas turbine fuel flow control valve;
the curve segment AGB is a circular arc, and the radius R satisfies: R=D/(1−cos 2α), wherein D is the diameter of the flow limiting core;
the curve segment EGF is an elliptic arc, satisfying the elliptic equation:

$$4x^2/D^2 + y^2/L_{GH}^2 = 1;$$

the plane where the ellipse equation is located is the second reference plane; the x axis of a rectangular coordinate system of the elliptic equation coincides with the straight line HG, and the coordinate origin coincides with the third reference point H; and $L_{GH}$ is the length of the line segment HG.

In the technical solution of the application, the flow and pressure control device is a hydraulic device flow and pressure control valve;
the curve segment AGB is a circular arc, and the radius R satisfies: R=$L_{AB}$, where $L_{AB}$ is the length of the line segment AB;
the curve segment EGF is a circular arc, and the circular arc radius R satisfies: R=$L_{GH}$, wherein $L_{GH}$ is the length of the line segment HG.

In the technical solution of the application, the flow and pressure control device is an oil field and oil well flow and pressure control valve;
the curve segment AGB is a circular arc, and the radius R satisfies: R=$L_{AB}$, where $L_{AB}$ is the length of the line segment AB;
the curve segment EGF is an elliptic arc, satisfying the elliptic equation:

$$4x^2/D^2 + y^2/L_{GH}^2 = 1;$$

the plane where the elliptic equation is located is the second reference plane; the x axis of a rectangular coordinate system of the elliptic equation coincides with the straight line HG, and the coordinate origin coincides with the third reference point H; D is the diameter of the flow limiting core and $L_{GH}$ is the length of the line segment HG.

In the technical solution of the application, the flow and pressure control device is a sand and stone flow control funnel;
the curve segment AGB is a circular arc, and the radius R satisfies: R=$L_{AB}$, where $L_{AB}$ is the length of the line segment AB;
the curve segment EGF is an elliptic arc, satisfying the elliptic equation:

$$4x^2/D^2 + y^2/L_{GH}^2 = 1;$$

the plane where the elliptic equation is located is the second reference plane; the x axis of a rectangular coordinate system of the elliptic equation coincides with the straight line HG, and the coordinate origin coincides with the third reference point H; D is the diameter of the flow limiting core and $L_{GH}$ is the length of the line segment HG.

In the technical solution of the application, the flow and pressure control device is a flow control water valve;

the curve segment AGB is a circular arc, and the radius R satisfies: $R=L_{AB}$, where $L_{AB}$ is the length of the line segment AB;

the curve segment EGF is a circular arc, and the circular arc radius R satisfies: $R=L_{GH}$, wherein $L_{GH}$ is the length of the line segment HG.

In the technical solution of the application, the angle β is greater than 0° and less than 90°, and an end face of the inlet pipe is a planar elliptical ring, and the axis of the inlet pipe passes through the center of the elliptical ring.

In the technical solution of the application, the angle β is greater than 0° and less than 90°, an end face of the inlet pipe is a concave elliptical ring, and the axis of the inlet pipe passes through the center of the elliptical ring.

In the technical solution of the application, the concave elliptical ring has the same shape as the inclined and inwardly recessed surface, and the curved segment AGB is a portion of a parabola that satisfies:

$$H_1 = D\left(1 - \sqrt{(L-L_1)/L}\right);$$

$H_1$ is the distance from the fifth reference point G to the straight line BI; D is the diameter of the flow limiting core; L is the length of the line segment AB projected in the axial direction of the flow limiting core, and $L_1$ is the distance of the second reference point B and the fifth reference point G projected in the axial direction of the flow limiting core;

the curve segment EGF is a circular arc, and the circular arc radius R satisfies: $R=L_{GH}$, wherein $L_{GH}$ is the length of the line segment HG.

In the technical solution of the application, the tip of the flow limiting core is provided with a cutting surface, which is perpendicular to the axis of the flow limiting core.

In the technical solution of the application a flow control ball valve comprises a valve body, a flow limiting core and an adjustment device;

the valve body is a spherical shell and is provided with a through shell passage with an elliptic cross section; the axis of the shell passage passes through the spherical center of the spherical shell;

the flow limiting core is a spherical core and is provided with a through core passage with an elliptic cross section; the axis of the core passage passes through the spherical center of the spherical core;

the cross sections of the shell passage and the core passage are the same in shape and size, and an elliptic fluid passage can be formed; the major axis of the cross section of the elliptic fluid passage and the axis of the elliptic fluid passage form a reference plane; the adjustment device can drive the flow limiting core to rotate around a reference axis, which is the axis that passes through the center of the sphere and is perpendicular to the reference plane.

In the technical solution of the application, the cross section ellipse of the elliptic fluid passage has the same shape as a reference ellipse;

the reference ellipse satisfies the equation:

$$x^2/4 + y^2 = 1.$$

The technical solutions of the application can realize at least one of the following effects:

the operating section of the technical solution of the application is approximately circular or approximately elliptical or is a combination of a partially circular shape and a partially elliptical shape, so that in the case where the disclosure has the same pass-through section proportions as the prior art, the diameter of passing particles (or impurities) are at least 2-10 times, thereby reducing the interference of impurities and fouling on operation the device, and reducing wear and tear of the device. In the same principle, the special flow control operating surface design of the flow control core in the technical solution can properly reduce the precision requirement of the manufacturing process of the devices, and at the same time, has lower requirements on the thermal coefficient and the abrasion resistance of the material of the key part, so that the manufacturing cost of the devices can be effectively reduced. Therefore, the application is an anti-interference flow control innovative technical solution which is wide in applicable industry, less in material limitation, low in manufacturing and operating cost and good in operation stability.

In the present application, the above technical solutions may be combined with each other to realize more preferable combination solutions. Additional features and advantages of the application will be set forth in the description which follows, and some of the advantages will be obvious from the description, or may be learned by the practice of the application. The objectives and other advantages of the application may be realized and attained by the structure particularly pointed out in the description and claims hereof as well as the appended drawings.

BRIEF DESCRIPTION OF DRAWINGS

The drawings, in which like reference numerals refer to like parts throughout, are for the purpose of illustrating particular embodiments only and are not to be considered limiting of the application.

FIG. 2-1 is a schematic view illustrating a case where curve segment AGB is defined as ii in the embodiment of the present application;

FIG. 2-2 is a schematic view illustrating a case where curve segment AGB is defined as i in the embodiment of the present application;

FIG. 4-1 is a schematic view illustrating a case where curve segment EGF is defined as II in the embodiments of the present application;

FIG. 4-2 is a schematic view illustrating a case where curve segment EGF is defined as I in the embodiment of the present application;

REFERENCE NUMERALS ARE AS FOLLOWS

Figure 1:
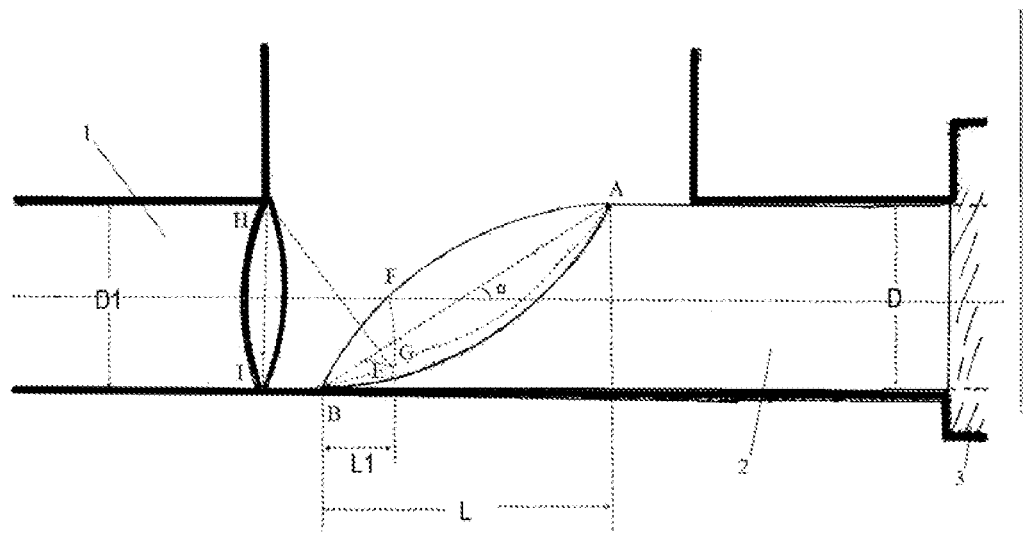
FIG. 1 is a schematic structural view of an embodiment of the present application.

1—valve body; 2—flow limiting core; 3—adjustment device.

DETAILED DESCRIPTION OF THE INVENTION

The accompanying drawings, which are incorporated in and constitute a part of this application, illustrate preferred embodiments of the present application and together with the description, serve to explain the principles of the application and not to limit the scope of the application.

The application provides a technical solution which is superior to the prior art design, and is a basic technical solution by technical means of providing a larger to largest flow control pipe diameter under the same working conditions to reduce the fluid resistance and the risk of blocking, so that higher flow control stability and precision are obtained at the same time with lower energy consumption and higher efficiency. This application effectively reduces the interference of passing objects on control accuracy of the flow control device, and it also has the advantages of low component wear rate and longer service life. It is a foundational technology that is suitable for many fields, including but not limited to industrial and mining, petrochemical gas, forging, 3D printing, material injection, cosmetic medicine and health care, intelligent robot manufacturing and industrial equipment manufacturing, etc. It is a flow and flow rate control method and series of application devices that have larger fault tolerance space for interference factors, such as viscosity, uniformity, purity, etc., in the process of material transmission and flow control in various fields, including cells and drug molecular clusters etc., and are more beneficial to flow and pressure stabilization. In addition, in the application field of microscopic particles, particle passages and gate valves can be constructed at a specific spatial position by combining force fields in specific directions according to a macroscopic technical solution, so that the technical effect equivalent to a macroscopic flow control effect is realized. Products applying the technical solutions of the present application have the advantages of simple and reliable structure, no additional special requirements on required materials and manufacturing processes, high adaptability to equipment abrasion and local defects and the like, which are widely suitable for production and application in various industries, and can generate huge economic value.

The principle of the flow control method in the technical solution of the application is as follows: in the technical solution of controlling the amount of materials or fluids which can pass through in unit time by adjusting the flow control passage section area, an approximately circular or oval flow control passage with relatively close foci is maintained as far as possible, so as to continuously obtain a larger or even the largest flow limiting section inscribed circle radius r value, that is to say, the flow control passage which can pass through a larger or the largest sphere is kept as far as possible under the condition of the same flow limiting section area. In the specific implementation device, a mathematical formula of the shape change of the flow control section of the flow control valve port in the working process is set, so that a good low-resistance and fault-tolerant channel can be provided for the passage of fluid, and the technical effects of efficiency improvement, consumption reduction, interference resistance and accurate flow and pressure control are achieved.

For a traditional needle valve, this application embodiment provides a flow and pressure control device, and the flow and pressure control device includes: a valve body 1, a flow limiting core 2 and an adjustment device 3; the valve body 1 is a bent pipe or other cavity with a circular or oval cross section, including an inlet pipe and an outlet pipe with a circular or oval cross section and a transition cavity connecting the inlet pipe and the outlet pipe; the flow limiting core 2 is inserted into the inlet pipe from the bent part; the flow limiting core 2 can be inserted into the inlet pipe, the end part of which is provided with an inclined and inwardly recessed surface, and the inclined and inwardly recessed surface faces the outlet pipe; the adjustment device 3 is used for adjusting a depth of the flow limiting core 2 inserted into the inlet pipe, and the flow limiting core cannot rotate and can only move horizontally through the adjustment device 3; when the flow limiting core 2 is completely inserted into the inlet pipe, the fluid passage of the inlet pipe is blocked by the flow limiting core 2. The existing needle valves all adopt conical tips, and the fluid passage is annular when controlling the flow. Under the condition of the same flow, the diameter of the smallest particle which can be allowed to pass through by an annular structure is the smallest. In the present embodiment, the conical shape is improved into an inclined surface to form an arched fluid passage, which increases the inscribed circle radius. In order to further improve the inscribed circle radius of the fluid passage, the inclined surface is further improved into an inwardly recesses surface in the embodiment of the application, so that the section of the fluid passage is of complex shapes formed by outwards convex curves such as circular arcs, elliptical arcs and the like, to increase the inscribed circle radius to the greatest extent. When the fluid containing particles is controlled, such as cement mortar of concrete, the flow limiting core 2 can be prevented from being blocked by the particles, and when the viscous fluid is controlled, such as paint, glycerol, asphalt and the like, the flow speed of the fluid in small-size channels can be prevented from being slowed down due to high viscosity.

For convenience of explanation, a plurality of virtual planes, virtual straight lines, and virtual points are defined in the embodiments of the present application.

The inclined and inwardly recessed surface is symmetrical about a first reference plane which is a longitudinal symmetry plane of the valve body 1.

The edge of the inclined and inwardly recessed surface and the first reference plane are intersected at a first reference point A and a second reference point B, wherein the first reference point A is a point in the inclined and inwardly recessed surface that last inserts into the inlet pipe, and the second reference point B is a point in the inclined and inwardly recessed surface that first inserts into the inlet pipe.

An inner edge of an end face of the inner wall of the inlet pipe intersects with the first reference plane at a third reference point H and a fourth reference point I; the third reference point H can coincide with the first reference point A, and the fourth reference point I can coincide with the second reference point B.

On the first reference plane, a straight line which passes through the third reference point H and is perpendicular to the line segment AB intersects with the inclined and inwardly recessed surface at a fifth reference point G; the first reference plane intersects with the inclined and inwardly recessed surface at a symmetric central curve segment AGB, and the symmetric central curve segment AGB is a concave curve.

A second reference plane which passes through the third reference point H and is perpendicular to the line segment AB intersects with the edge of the inclined and inwardly recessed surface at a sixth reference point E and a seventh reference point F; the second reference plane and the inclined and inwardly recessed surface are intersected at a vertical plane cross section curve segment EGF, and the vertical plane cross section curve segment EGF is a concave curve.

An angle α between a line segment AB connecting the first reference point A and the second reference point B and a fluid flowing direction of the axis of the inlet pipe is greater than 0° and less than 90°, ensuring the tip of the flow limiting core 2 is an inclined surface. The specific angle is not limited. The angle α can be increased when a small stroke is needed, and can be reduced when precise control is needed.

An angle β between a connecting line HI connecting the third reference point H and the fourth reference point I and the fluid flowing direction of the axis of the inlet pipe is greater than 0° and less than or equal to 90°; when the angle β is less than 90°, the end surface of the inlet pipe faces the outlet pipe. The end surface of the inlet pipe can be vertical to the axis of the inlet pipe and can also be inclined. But when the end surface is inclined, it is inclined towards the outlet pipe so as to ensure that the fluid can flow out smoothly.

Figure 6:
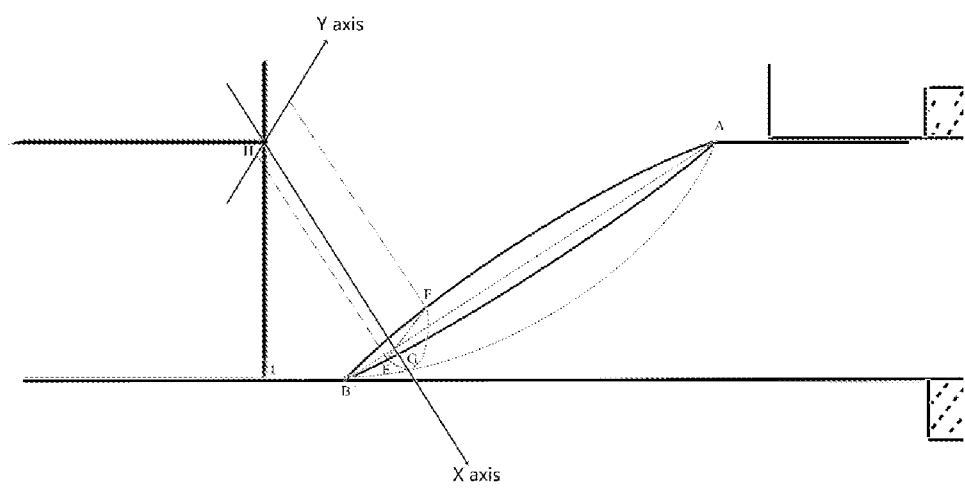
FIG. 6 is a schematic view of a coordinate system for the case where curve segment EGF is defined as I in the embodiment of the present application.

In order to increase the inscribed circle radius of the fluid passage as much as possible, the symmetric central curve segment AGB is defined as follows:
I. as shown in FIG. 6, the symmetric central curve segment AGB is a circular arc;
i. when the angle α satisfies: 0°<α≤30°, the radius R of the symmetric central curve segment AGB satisfies: R=D/(1−cos 2α), where D is the diameter of the flow limiting core 2;
ii. when the angle α satisfies: 30°<α<90°, the radius R of the symmetric central curve segment AGB satisfies: R=$L_{AB}$, where $L_{AB}$ is the length of the line segment AB.
II. The symmetric central curve segment AGB is a part of a parabola, and satisfies:

$$H_1 = D(1 - \sqrt{(L - L_1)/L});$$

$H_1$ is the distance from the fifth reference point G to a straight line BI. D is the diameter of the flow limiting core 2. L is a length of the line segment AB projected in the axial direction of the flow limiting core 2, and $L_1$ is a distance of the second reference point B and the fifth reference point G projected in the axial direction of the flow limiting core 2.

In order to increase the inscribed circle radius of the fluid passage as much as possible, the embodiment of the present application also defines the vertical plane cross section curve segment EGF as follows:
I. the vertical plane cross section curve segment EGF is an elliptic arc, satisfying the elliptic equation:

$$4x^2/D^2 + y^2/L_{GH}^2 = 1;$$

the plane where the elliptic equation is located is the second reference plane; the x axis of a rectangular coordinate system of the elliptic equation coincides with the straight line HG, and the coordinate origin coincides with the third reference point H; D is the diameter of the flow limiting core 2 and $L_{GH}$ is the length of the line segment HG.
II. The vertical plane cross section curve segment EGF is a circular arc having a radius R satisfying: R=$L_{GH}$, wherein $L_{GH}$ is the length of the line segment HG.

Some factors of geometric function characteristics can be considered when a curved surface matching the inclined and inwardly recessed surface is designed. The symmetric central curve segment AGB can adopt the scheme II to obtain a linear change relation of approximate positive correlation between the advance and retreat distance of the flow limiting core 2 and the flow control section area, and the edge of the inclined and inwardly recessed surface of the sharp bevel structure of the whole flow limiting core 2, particularly the part of the near end point A, can be matched with the inner edge of the circular valve port of the valve body 1 to generate a cutting effect, so that the condition that the traditional needle valve is closed due to the blockage of a material on the annular cut surface is not easy to occur, and the effect of the technical solution is more prominent when the interference of non-uniform objects or impurities such as frangibility, high viscosity and the like is resisted; by adopting the scheme I for the vertical plane cross section curve segment EGF, a larger HG value can be obtained at the stage that the flow limiting core 2 has more propulsion and a smaller flow control section, so that a design space for obtaining a larger inscribed circle radius of the flow control section is provided.

Figures 1, 2:
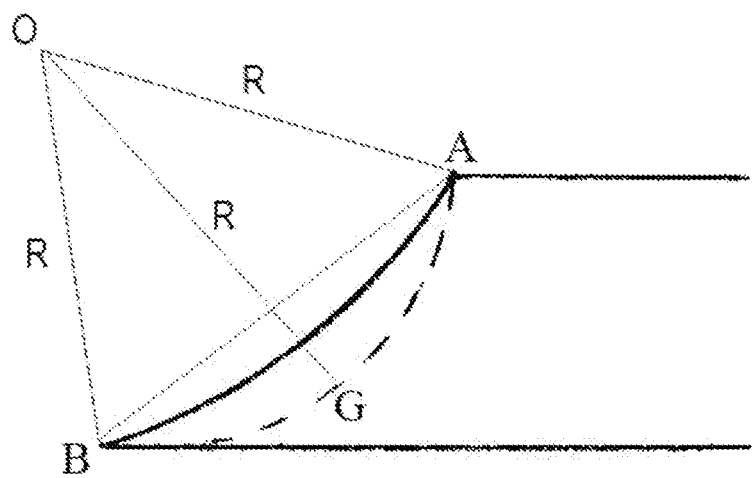
Figure 2:
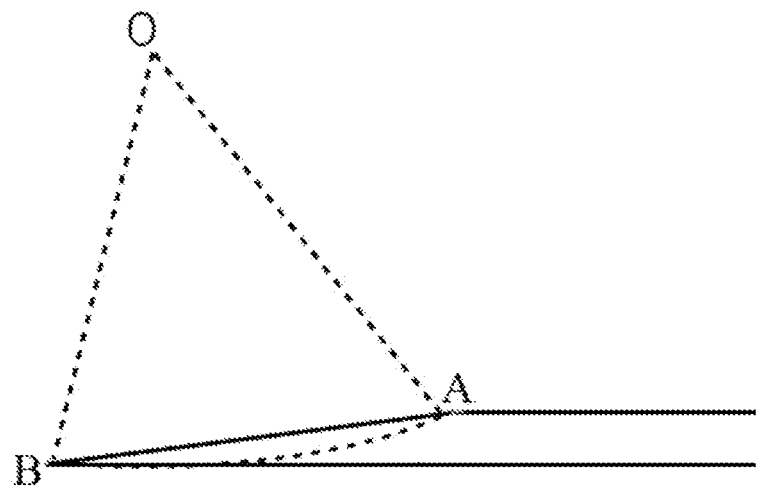
Figure 3:
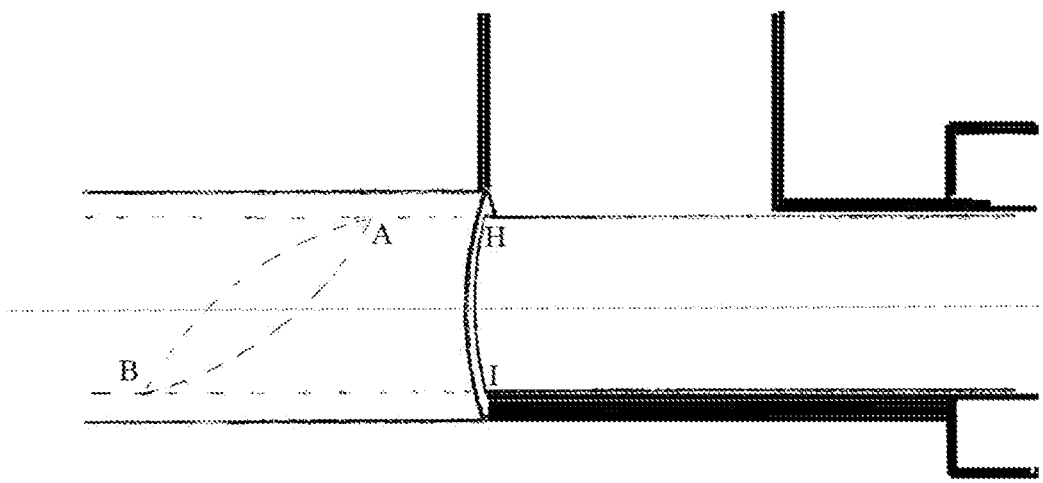
FIG. 3 is a schematic view of a flow limiting core inserted into a valve body according to the embodiment of the present application.
Figures 1, 4:
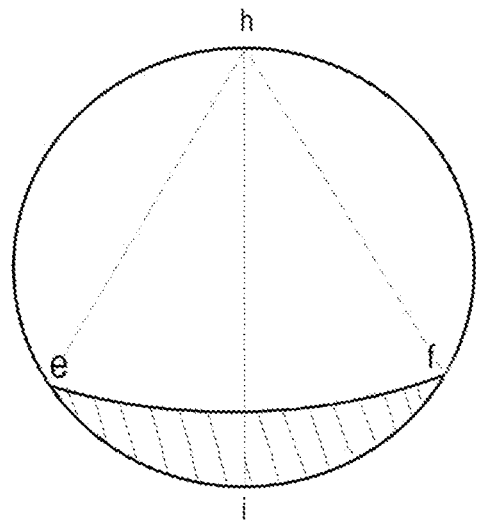
Figures 2, 4:
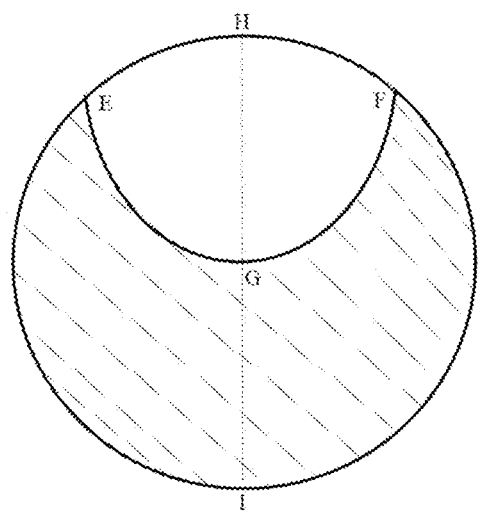
Figure 5:
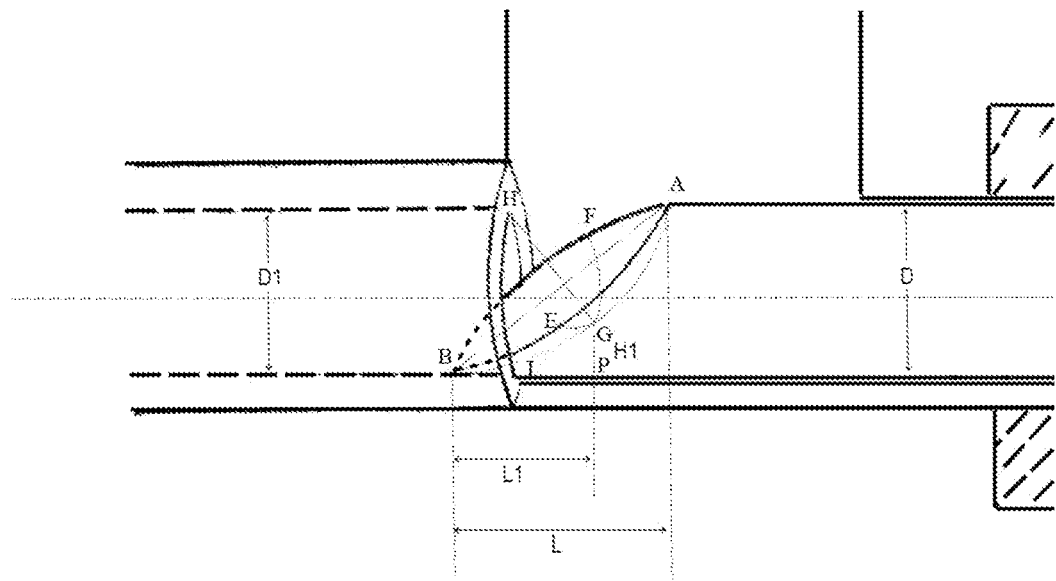
FIG. 5 is a schematic view of reference points locations in the embodiment of the present application.

The flow control device consists of a valve body 1, a flow limiting core 2 and an adjustment device, wherein the valve body 1 is provided with a circular valve port. When the device works, materials can be limited to pass between an outlet pipe where the flow limiting core 2 is positioned and an inner cavity of the valve body 1 through the circular valve port, and the inner cavity of the valve body 1 and/or the outlet pipe are respectively connected with other spaces according to material transmission requirements. As shown in FIGS. 2-1 and 2-2, the flow limiting core 2 is a cylinder with a sharp bevel structure at one end pointing to the circular valve port of the valve body 1, and the length of the sharp bevel structure on the axis of the flow limiting core 2 is L. The center of the circular valve port of the valve body 1 is located on the axis of the flow limiting core 2, and the diameter D1 of the circle center is equal to the diameter D of the cylinder of the flow limiting core 2. The operation of the adjustment device can limit the flow limiting core 2 to move back and forth in the axis direction of the flow limiting core 2, and at least the whole sharp bevel structure and part of the cylinder structure of the flow limiting core 2 can enter the inner cavity of the valve body 1 through the circular valve port of the valve body 1 and can be withdrawn to leave the circular valve port completely. When the cylinder is pushed into the inner cavity of the valve body 1, the cylinder structure of the flow limiting core 2 is completely matched with the circular valve port structure of the valve body 1 so as to realize the separation of the inner cavity of the valve body 1 and the outlet pipe, that is to say, the valve is completely closed, and the designed flow is zero under this condition. As shown in FIG. 3, on the contrary, if the valve exits to the certain distance from the inner cavity of the valve body 1 after the whole flow limiting core 2 leaves the inner cavity of the valve body 1, the passage between the inner cavity of the valve body 1 and the outlet pipe obtains the maximum flow limiting section area, that is to say, the valve is completely opened, and the maximum designed flow is reached, as shown in FIG. 1. The bevel part of the sharp bevel structure of the head part of the flow limiting core 2 is a inclined and inwardly recessed surface which is bilaterally symmetrical in the axis direction instead of the conical design of a traditional needle valve, the cross section of the flow control passage formed by the design is approximately circular or approximately elliptical or is a combination of a partially circular shape and a partially elliptical shape instead of the circular ring shape of the traditional needle valve. The intersecting points of a virtual plane ABIH on the axis of the flow limiting core 2 and passing through a far end point B and a near end point A of the inclined and inwardly recessed surface and the circular valve port inner edge of the valve body 1 are respectively a point H and a point I which is closer to the far end point B of the inclined and inwardly recessed surface. A line HA and a line IB are both parallel to the axis of the flow limiting core 2, and a straight line passing through the point H and perpendicular to the line segment AB is intersected with the inclined and inwardly recessed surface at a point G, that is to say, the line HG is perpendicular to the line segment AB. A straight line passing through the point G and line segment IB perpendicularly intersect at point P, that is to say, the line segment GP is perpendicular to the line segment IB, the line segment HA and the axis of the flow limiting core 2. The intersection part of the virtual plane ABIH and the inclined and inwardly recessed surface is the "symmetric central curve segment" AGB of the inclined and inwardly recessed surface of the present application, that is to say, the inclined and inwardly recessed surface is completely in cubical symmetry on both sides by taking the symmetric central curve segment AGB as the center. The acute angle α at the front end of the sharp structure of the flow limiting core 2 is the angle between the straight line segment AB and the axis of the flow limiting core 2, and 0°<α<90°. As shown in FIGS. 4-1 and 4-2, when the adjustment device is operated to push the flow limiting core 2 until the far end point B of the inclined and inwardly recessed surface has entered the inner cavity of the valve body 1, but the near end point A has not reached the plane of the circular valve port of the valve body 1, the inclined and inwardly recessed surface and the circular valve port of the valve body 1 jointly form a flow control passage connecting the inner cavity and the outlet pipe of the valve body 1 and having an approximately circular or approximately elliptical or a combination of a partially circular shape and a partially elliptical shape cross section. The intersection part of the flow control section passing through H, G and perpendicular to the line segment AB and the inclined and inwardly recessed surface is the "vertical plane cross section curve segment" EGF of the curved surface of the inclined and inwardly recessed surface of the present application, as shown in FIG. 5. Selecting different functions to define the symmetric central curve segment AGB and the vertical plane cross section curve segment EGH of the inclined and inwardly recessed surface of the flow limiting core 2 can obtain inclined and inwardly recessed surfaces of different curved surfaces, so that the inscribed circle radius r value of the continuously larger or largest flow limiting section in all flow values is obtained, or the variation function relation between the propelling distance of the flow limiting core 2 and the real-time flow value is set according to the requirements of working conditions while the relatively larger r value is kept.

The flow control technical solution of the present application is shown by referring to the structure of a needle valve. Compared with the prior art, the present application is an innovative flow and pressure control technical solution for keeping a larger flow control caliber under the condition of the same flow, which is beneficial to reducing the material passing resistance, increasing the efficiency and reducing the consumption, and can also reduce the interference and part damage caused by uneven materials or impurities to the flow and pressure control operation, especially has smaller influence under the condition that the working surface of a part is damaged. Most of the parts made according to the technical principles of this application also have the advantages of easy processing, low material and precision requirements, and long service life. The technical solution of this application is widely suitable for traditional light and heavy industries, precision/intelligent manufacturing, and construction of microscopic particle gates, which has broad application prospects and huge economic value and social benefits.

Because the acute angle α of the sharp structure of the flow limiting core 2 close to 0° is required to obtain the theoretical continuous maximum r value, the length of the symmetric central curve segment AGB is not in accordance with the practical application, and the design of the inclined and inwardly recessed surface curved surface is limited by the range of the value L, D and a allowed by the working condition in the reality.

Apart from some special devices, the acute angle α of the sharp structure of the flow limiting core 2 is usually chosen between 11° and 71°, i.e. the L/D value is approximately between 5.15 and 0.34, according to the requirements of the progressive operation. Equipment parts of some industrial are more suitable for adopting an a value of 11°-30°, i.e. the L/D value is about 5.15-1.73, while other industries sometimes need a smaller L/D value and adopt an a value between 45°-56°, i.e. the L/D value is about 1-0.67. After defining the symmetric central curve segments AGB and the vertical plane cross section curve segment EGH with different function equations, various low-resistance and anti-interference precise flow control effects meeting the requirements of related production operation can be realized. It should be noted that when the a value is greater than 45°, the adjustment device must at least retract the near end point A of the inclined and inwardly recessed surface of the flow limiting core 2 to a position where the distance from the point H of the circular valve port of the valve body 1 is not less than the diameter D1 of the circular valve port, so as to ensure that the passage with the theoretically maximum flow control section is obtained.

Figure 7:
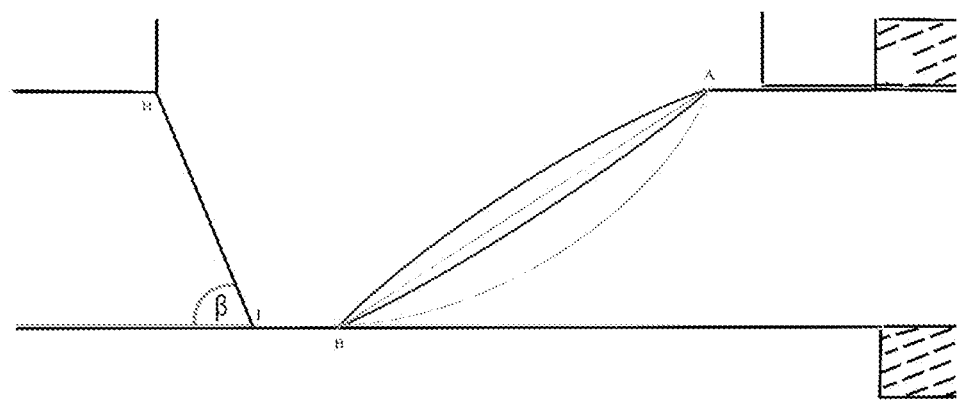
FIG. 7 is a schematic view illustrating an angle β greater than 0° and less than or equal to 90° according to the embodiment of the present application.

The valve port of the valve body 1 can be further designed into the end surface of the inlet pipe with the inclination angle of 0°<β<90°, the central point of the end surface of the inlet pipe is on the axis of the flow limiting core 2. The near end point of the elliptic inner edge of the valve port is the point H, and the far end point is the point I. As shown in FIG. 7, the point H and the point I are on the axis of the flow limiting core 2 and on the virtual plane ABIH passing through the far end point B and the near end point A of the inclined and inwardly recessed surface. After the curved surface of the inclined and inwardly recessed surface is determined by referring to the equation setting method, the end surface of the inlet pipe and the inclined and inwardly recessed surface can form a flow limiting passage. Adjusting the value of the inclination angle β can obtain different flow control effects and curves by combining the design parameters of the inclined and inwardly recessed surface.

Furthermore, the aforementioned end surface of the inlet pipe can be set that the inner edge of the valve port of the valve body 1 is on a virtual inclined concave surface TT by referring to the method of setting the inclined and inwardly recessed surface curved surface. When the oblique concave surface TT and the inclined and inwardly recessed surface are set according to the same function equation, i.e. the formed flow limiting passage is bilaterally symmetrical before being completely closed, the shape of the inner concave surface where the concave elliptical ring is located is the same as that of the inclined and inwardly recessed surface.

In the technical solution of the application, the symmetric central curve segment AGB is a part of a parabola, and satisfies:

$$H_1 = D\left(1 - \sqrt{(L-L_1)/L}\right);$$

$H_1$ is the distance from the fifth reference point G to the straight line BI; D is the diameter of the flow limiting core 2. L is the length of the line segment AB projected in the axial direction of the flow limiting core 2, and $L_1$ is the distance of the second reference point B and the fifth reference point G projected in the axial direction of the flow limiting core 2;

the vertical plane cross section curve segment EGF is a circular arc, and the circular arc radius R satisfies: $R=L_{GH}$, wherein $L_{GH}$ is the length of the line segment HG.

Figure 8:
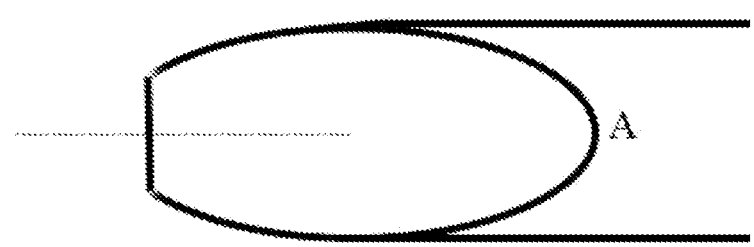
FIG. 8 is a schematic view of a cutting face of the embodiment of the present application.
Figure 8:
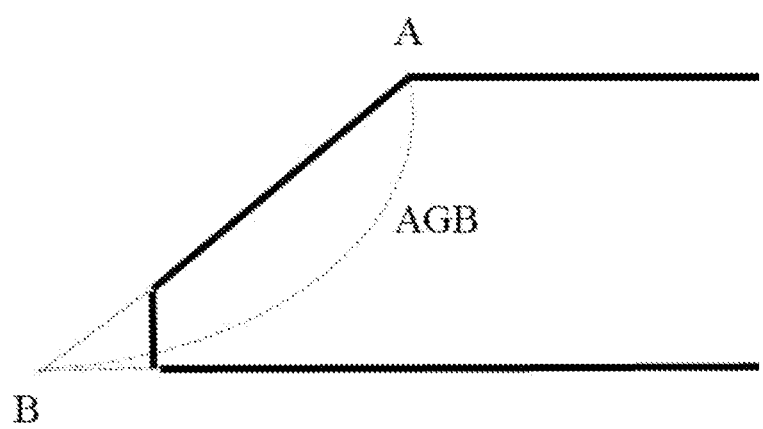

As shown in FIG. 8, in the present embodiment, the tip of the flow limiting core 2 is provided with a cutting surface perpendicular to the axis of the flow limiting core 2, and the tip of the flow limiting core 2 is removed by the cutting surface to be flat. The reason is that when the control is needed, a relatively small angle α is needed, so the flow limiting core 2 is long, and the tip has no significant influence on the flow passage section area, so it is removed to save material and for easy processing and installation. In addition, under severe environments or when the amount of particles in the fluid is large, the tip of the flow limiting core 2 is easily damaged, so that the overall flow limiting effect is affected, and the tip needs to be removed. For special applications, such as robotic hydraulic control, relatively small strokes are required, and the tip needs to be removed.

The following embodiments are provided to illustrate some specific applications of the present disclosure.

Embodiment 1

A hot runner flow control valve for 3D printing equipment comprises a valve body 1, a flow limiting core 2 and a spiral adjustment device, wherein a circular valve port is provided on the valve body 1, through which 3D printing materials enter an inner cavity of the valve body 1 and are further conveyed to a printing nozzle when the flow control valve works, or a hot melting nozzle pipe is directly formed in the inner cavity of the valve body 1 of the flow control valve. As shown in FIG. 5, the flow limiting core 2 is a cylinder with a sharp bevel structure at one end pointing to the circular valve port of the valve body 1, and the inclined plane on the sharp bevel structure is an inclined and inwardly recessed surface which is bilaterally symmetrical in the axis direction of the flow limiting core 2. The center of the circular valve port of the valve body 1 is positioned on the axis of the flow limiting core 2, and the inner edge diameter D1 of the circular valve port and the diameter D of the cylinder part of the flow limiting core 2 are both 2 mm. Operating the spiral adjustment device can limit the flow limiting core 2 to move forwards and backwards only in the axis direction of the flow limiting core 2, and the movement range at least comprises that the sharp bevel structure of the flow limiting core 2 can completely enter the inner cavity of the valve body 1 through the circular valve port of the valve body 1 when being pushed in and completely leave the inner cavity of the valve body 1 when exit. The angle α between the connecting line of the far end point B and the near end point A of the inclined and inwardly recessed surface of the sharp bevel structure of the flow limiting core 2 and the axis of the flow limiting core 2 is 16°. The length of the sharp bevel structure of the flow limiting core 2 on the axis is L=D/tan α≈6.975 mm. The connecting line of the top end point H of the valve port inner edge and the near end point A of the inclined and inwardly recessed surface of the sharp bevel structure of the flow limiting core 2 is parallel to the axis of the flow limiting core 2, and the straight line connecting the end point I of the bottom of the circular valve port inner edge of the valve body 1 and the far end point B of the inclined and inwardly recessed surface of the sharp bevel structure of the flow limiting core 2 is parallel to the axis of the flow limiting core 2.

The symmetric central curve segment AGB is a part of a parabola, and satisfies:

$$H_1 = D\left(1 - \sqrt{(L-L_1)/L}\right);$$

$H_1$ is the distance from the fifth reference point G to the straight line BI. D is the diameter of the flow limiting core 2. L is the length of the line segment AB projected in the axial direction of the flow limiting core 2, and $L_1$ is the distance of the second reference point B and the fifth reference point G projected in the axial direction of the flow limiting core 2;

the vertical plane cross section curve segment EGF is an elliptic arc, satisfying the elliptic equation:

$$4x^2/D^2 + y^2/L_{GH}^2 = 1;$$

the plane where the elliptic equation is located is the second reference plane; the x axis of a rectangular coordinate system of the elliptic equation coincides with the straight line HG, and the coordinate origin coincides with the third reference point H; $L_{GH}$ is the length of the line segment HG.

In addition to the various advantages of the technical solution of the present application, the inclined and inwardly recessed surface design focuses on providing flow and pressure control valves for 3D printing devices that have targeted and beneficial effects such as having a stable change, a large bore, and a certain material cutting function when closing completely to prevent valve from drying up.

Because of reasons like high viscosity of some 3D printing material, like PLA, etc., the 3D printing devices that adopts hot melt material have the problems like the runner being plugged up by impurity, the hot runner valve needle not smooth, the valve needle seals not tight, etc., and the technical solution of the present application can reduce relevant problems greatly, and especially has obvious advantage in the application of micro-nano 3D printing technology.

Embodiment 2

A fuel flow control valve for a vehicle thermal gas turbine comprises a valve body 1, a flow limiting core 2 and a spiral adjustment device, wherein a circular valve port is provided on the valve body 1, through which fuel enters an inner cavity of the valve body 1 and is further conveyed to a working fire nozzle when the flow control valve works, or a fire nozzle is directly formed in the inner cavity of the valve body 1 of the flow control valve. As shown in FIG. 5, the flow limiting core 2 is a cylinder with a sharp bevel structure at one end pointing to the circular valve port of the valve body 1, and the inclined plane on the sharp bevel structure is an inclined and inwardly recessed surface which is bilaterally symmetrical in the axis direction of the flow limiting core 2. The center of the circular valve port of the valve body 1 is positioned on the axis of the flow limiting core 2, and the inner edge diameter D1 of the circular valve port and the diameter D of the cylinder part of the flow limiting core 2 are both 3.8 mm. Operating the spiral adjustment device can limit the flow limiting core 2 to move forward and backward only in the axis direction of the flow limiting core 2, and the movement range at least comprises that the sharp bevel structure of the flow limiting core 2 can completely enter the inner cavity of the valve body 1 through the circular valve port of the valve body 1 when being pushed in and completely leave the inner cavity of the valve body 1 when exit. The angle $\alpha$ between the connecting line of the far end point B and the near end point A of the inclined and inwardly recessed surface of the sharp bevel structure of the flow limiting core 2 and the axis of the flow limiting core 2 is 11°. The length of the sharp bevel structure of the flow limiting core 2 on the axis is L=D/tan $\alpha \approx$19.55 mm. The connecting line of the top end point H of the valve port inner edge and the near end point A of the inclined and inwardly recessed surface of the sharp bevel structure of the flow limiting core 2 is parallel to the axis of the flow limiting core 2, and the straight line connecting the end point I of the bottom of the circular valve port inner edge of the valve body 1 and the far end point B of the inclined and inwardly recessed surface of the sharp bevel structure of the flow limiting core 2 is parallel to the axis of the flow limiting core 2.

The symmetric central curve segment AGB is a circular arc, and the radius R satisfies: R=D/(1−cos 2$\alpha$), wherein D is the diameter of the flow limiting core 2;

the vertical plane cross section curve segment EGF is an elliptic arc, satisfying the elliptic equation:

$$4x^2/D^2 + y^2/L_{GH}^2 = 1;$$

the plane where the elliptic equation is located is the second reference plane; the x axis of a rectangular coordinate system of the elliptic equation coincides with the straight line HG, and the coordinate origin coincides with the third reference point H; $L_{GH}$ is the length of the line segment HG.

In addition to the various advantages of the technical solution of the present application, the inclined and inwardly recessed surface design focuses on providing fuel flow and pressure control valves for vehicle thermal gas turbines that have targeted and beneficial effects such as long engineering and obvious changes in the middle section.

Various traffic production tools and devices using heat combustion engine comprise various flow and pressure control components with structures similar to a needle valve, such as air valves, steam valves, oil inlet and outlet valves of gasoline pumps, needle valves of carburetors and the like. Despite national mandatory regulations, there are still some gas stations or temporary fuel depots using fuel dispensers which are not equipped with filter screens, and oil guns which are not equipped with filter elements, and single-level depots which are prone to generate metal chips. Taking a gasoline vehicle as an example, the consequence of unsmooth oil path caused by any reason is not just unstable idling. The technical solution of the present application is suitable for various working conditions, and can reduce the problems caused by dust and the like blocking an air valve, dirt blocks a steam valve, and scale and impurities affecting working conditions of an oil inlet and outlet valve of a gasoline pump and a needle valve of a carburetor, and the improvement is obvious.

Embodiment 3

A hydraulic device flow control valve comprises a valve body 1, a flow limiting core 2 and a spiral adjustment device, wherein a circular valve port is provided on the valve body 1, through which hydraulic oil can enter and exit an inner cavity of the valve body 1 when the flow control valve works. As shown in FIG. 5, the flow limiting core 2 is a cylinder with a sharp bevel structure at one end pointing to the circular valve port of the valve body 1, and the inclined plane on the sharp bevel structure is an inclined and inwardly recessed surface which is bilaterally symmetrical in the axis direction of the flow limiting core 2. The center of the circular valve port of the valve body 1 is positioned on the axis of the flow limiting core 2, and the inner edge diameter D1 of the circular valve port and the diameter D of the cylinder part of the flow limiting core 2 are both 96.52 mm. Operating the spiral adjustment device can limit the flow limiting core 2 to move forward and backward only in the axis direction of the flow limiting core 2, and the movement range at least comprises that the sharp bevel structure of the flow limiting core 2 can completely enter the inner cavity of the valve body 1 through the circular valve port of the valve body 1 when being pushed in, and the far end point B of the inclined and inwardly recessed surface of the sharp bevel structure of the flow limiting core 2 completely leaves the inner cavity of the valve body 1 when exit to reach more than 96.52 mm from the top end point H of the inner edge of the circular valve port of the valve body 1. The angle $\alpha$ between the connecting line of the far end point B and the near end point A of the inclined and inwardly recessed surface of the sharp bevel structure of the flow limiting core 2 and the axis of the flow limiting core 2 is 71°. The length of the sharp bevel structure of the flow limiting core 2 on the axis is L=D/tan $\alpha \approx$15.29 mm. The connecting line of the top end point H of the valve port inner edge and the near end point A of the inclined and inwardly recessed surface of the sharp bevel structure of the flow limiting core 2 is parallel to the axis of the flow limiting core 2, and the straight line connecting the end point I of the bottom of the circular valve port inner edge of the valve body 1 and the far end point B of the inclined and inwardly recessed surface of the sharp bevel structure of the flow limiting core 2 is parallel to the axis of the flow limiting core 2.

The symmetric central curve segment AGB is a circular arc, and the radius R satisfies: $R=L_{AB}$, where $L_{AB}$ is the length of the line segment AB;

the vertical plane cross section curve segment EGF is a circular arc, and the radius R of the circular arc satisfies: $RA_{GH}$, wherein $L_{GH}$ is the length of the line segment HG.

In addition to the various advantages of the technical solution of the present application, the inclined and inwardly recessed surface design focuses on providing flow and pressure control valves for hydraulic devices that have targeted and beneficial effects such as low process change requirements and conducive to the rapid transmission of fluid pressure.

The high precision required for hydraulic system components is one of the reasons for the high cost of components compared to other transmission methods, and hydraulic oil resistance is one of the main reasons that hydraulic equipment can't guarantee a strict drive ratio. Hydraulic oil pollution will affect the response sensitivity of traditional flow and pressure control components and even cause failures. The technical solution of the present application can bring about beneficial effects such as more stable transmission ratio, low resistance loss, low component cost, and improved work efficiency.

Embodiment 4

A flow and pressure control valve for oil field and oil well comprises a valve body 1, a flow limiting core 2 and a spiral adjustment device, wherein a circular valve port is provided on the valve body 1, through which oil gas enters an inner cavity of the valve body 1 and is further conveyed to upstream and downstream related equipment when the flow control valve works. As shown in FIG. 5, the flow limiting core 2 is a cylinder with a sharp bevel structure at one end pointing to the circular valve port of the valve body 1, and the inclined plane on the sharp bevel structure is an inclined and inwardly recessed surface which is bilaterally symmetrical in the axis direction of the flow limiting core 2. The center of the circular valve port of the valve body 1 is positioned on the axis of the flow limiting core 2, and the inner edge diameter D1 of the circular valve port and the diameter D of the cylinder part of the flow limiting core 2 are both 600 mm. Operating the spiral adjustment device can limit the flow limiting core 2 to move forward and backward only in the axis direction of the flow limiting core 2, and the movement range at least comprises that the sharp bevel structure of the flow limiting core 2 can completely enter the inner cavity of the valve body 1 through the circular valve port of the valve body 1 when being pushed in, and the far end point B of the inclined concave plane of the sharp bevel structure of the flow limiting core 2 completely leaves the inner cavity of the valve body 1 when exit. The angle α between the connecting line of the far end point B and the near end point A of the inclined and inwardly recessed surface of the sharp bevel structure of the flow limiting core 2 and the axis of the flow limiting core 2 is 30°. The length of the sharp bevel structure of the flow limiting core 2 on the axis is L=D/tan α≈1039.23 mm. The connecting line of the top end point H of the valve port inner edge and the near end point A of the inclined and inwardly recessed surface of the sharp bevel structure of the flow limiting core 2 is parallel to the axis of the flow limiting core 2, and the straight line connecting the end point I of the bottom of the circular valve port inner edge of the valve body 1 and the far end point B of the inclined and inwardly recessed surface of the sharp bevel structure of the flow limiting core 2 is parallel to the axis of the flow limiting core 2.

The symmetric central curve segment AGB is a circular arc, and the radius R satisfies: $R=L_{AB}$, where $L_{AB}$ is the length of the line segment AB;

the vertical plane cross section curve segment EGF is an elliptic arc, satisfying the elliptic equation:

$$4x^2/D^2 + y^2/L_{GH}^2 = 1;$$

the plane where the elliptic equation is located is the second reference plane; the x axis of a rectangular coordinate system of the elliptic equation coincides with the straight line HG, and the coordinate origin coincides with the third reference point H; D is the diameter of the flow limiting core 2 and $L_{GH}$ is the length of the line segment HG.

In addition to the various advantages of the technical solution of the present application, the inclined and inwardly recessed surface design focuses on providing fuel flow and pressure control valves for oil wells and oil fields that have targeted and beneficial effects such as relatively large flow limiting section inscribed circle, and having a diversion angle facilitating the removal of corrosive fluids and impurities such as sand and gravel.

Valves are important components of oil and gas field facilities, and particularly for a gathering and transportation system, valves are widely used. At present, oil fields have entered a period of high water content development, and the corrosion of high water content to valves is increasingly serious, so that the valves often have the problems of leakage, oil mixing and the like. In short, the problem of the extremely difficult-to-handle sludge incremental pollution caused by various flow and pressure control devices is very serious. Internal leakage of parts that use gate valves design such as barrier valves, tank front valves and the like are also very common due to untight closing caused by bad working conditions and corrosion and difficult to maintain. In addition to many technical advantages described above, the oil and gas field adopting the technical solution of the application has outstanding corrosion tolerance due to the design advantages of interval seal between the flow limiting core 2 and the valve body 1 and the small influence of damage of the working face on the flow control effect is small.

Embodiment 5

Figure 10:
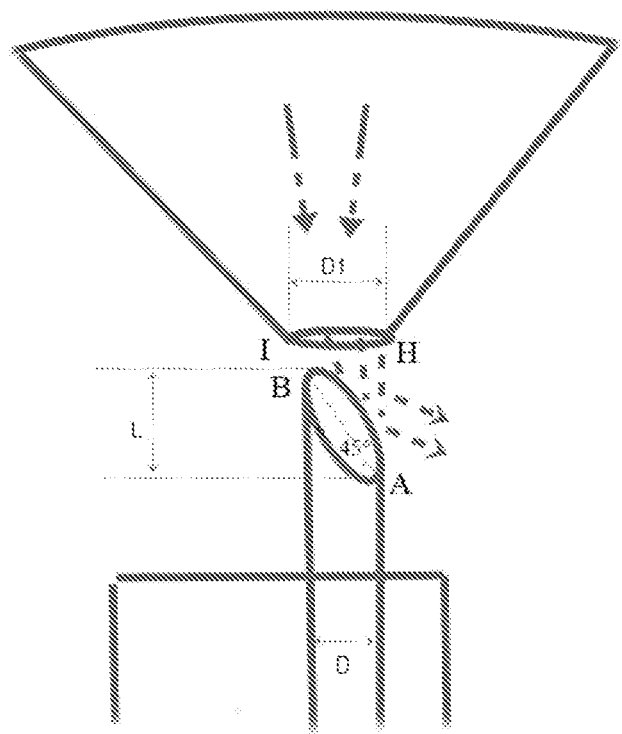
FIG. 10 is a schematic view of a crushed ore flow control funnel device according to the embodiment of the present application.

A crushed ore flow control funnel device comprises a funnel, a flow limiting core 2 and an adjustment device, wherein the funnel is in an inverted cone shape, and a circular valve port is provided at the tip end of the bottom of the funnel, through which crushed ore leaks out and then enters downstream related equipment when the funnel device works. As shown in FIG. 10, the flow limiting core 2 is a cylinder with a sharp bevel structure pointing to the circular valve port of the funnel from bottom to top, and the inclined plane on the sharp bevel structure is a left-right symmetrical inclined and inwardly recessed surface with the projection line segment of the axis of the flow limiting core 2 as the center line. The center of the circular valve port of the funnel is positioned on the axis of the flow limiting core 2, and the inner edge diameter D1 of the circular valve port and the diameter D of the cylinder part of the flow limiting core 2 are both 300 mm. Operating the spiral adjustment device can limit the flow limiting core 2 to move forward and backward only in the axis direction of the flow limiting core 2, and the movement range at least comprises that the sharp bevel structure of the flow limiting core 2 can be inserted into the material-carrying part of the funnel upwards through the circular valve port completely when being pushed in, and the far end point B of the inclined and inwardly recessed surface of the sharp bevel structure of the flow limiting core 2 completely leaves below the circular valve port of the funnel when exit. The angle α between the connecting line of the far end point B and the near end point A of the inclined and inwardly recessed surface of the sharp bevel structure of the flow limiting core 2 and the central axis of the flow limiting core 2 is 45°. The length of the sharp bevel structure of the flow limiting core 2 on the axis is L=D/tan α≈300 mm. The connecting line of the top end point H of the valve port inner edge and the near end point A of the inclined and inwardly recessed surface of the sharp bevel structure of the flow limiting core 2 is parallel to the axis of the flow limiting core 2, and the straight line connecting the end point I of bottom of the funnel circular valve port inner edge and the far end point B of the inclined and inwardly recessed surface of the sharp bevel structure of the flow limiting core 2 is parallel to the axis of the flow limiting core 2.

The symmetric central curve segment AGB is a circular arc, and the radius R satisfies: R=$L_{AB}$, where $L_{AB}$ is the length of the line segment AB;

the vertical plane cross section curve segment EGF is an elliptic arc, satisfying the elliptic equation:

$$4x^2/D^2 + y^2/L_{GH}^2 = 1;$$

The plane where the elliptic equation is located is the second reference plane; the x axis of a rectangular coordinate system of the elliptic equation coincides with the straight line HG, and the coordinate origin coincides with the third reference point H; D is the diameter of the flow limiting core 2 and $L_{GH}$ is the length of the line segment HG.

In addition to the various advantages of the technical solution of the present application, the inclined and inwardly recessed surface design focuses on providing crushed ore flow control funnel devices that have targeted and beneficial effects such as relatively large flow limiting section inscribed circle so that not easily blocked by crushed ores, and impacting of hard materials having little damage to the working surface.

Embodiment 6

A flow control water valve for reservoir flood discharge and field irrigation comprises a valve body 1, a flow limiting core 2 and a spiral adjustment device, wherein a circular valve port is provided in the valve body 1, through which water flow can enter an inner cavity of the valve body 1 and further flow downwards when the flow control water valve works. As shown in FIG. 5, the flow limiting core 2 is a cylinder with a sharp bevel structure at one end pointing to the circular valve port of the valve body 1, and the inclined plane on the sharp bevel structure is an inclined and inwardly recessed surface which is bilaterally symmetrical in the axis direction of the flow limiting core 2. The center of the circular valve port of the valve body 1 is positioned on the axis of the flow limiting core 2, and the inner edge diameter D1 of the circular valve port and the diameter D of the cylinder part of the flow limiting core 2 are both 500 mm. Operating the spiral adjustment device can limit the flow limiting core 2 to move forward and backward only in the axis direction of the flow limiting core 2, and the movement range at least comprises that the sharp bevel structure of the flow limiting core 2 can completely enter the inner cavity of the valve body 1 through the circular valve port of the valve body 1 when being pushed in, and the far end point B of the inclined and inwardly recessed surface of the sharp bevel structure of the flow limiting core 2 completely leaves the inner cavity of the valve body 1 when exit. The angle α between the connecting line of the far end point B and the near end point A of the inclined and inwardly recessed surface of the sharp bevel structure of the flow limiting core 2 and the central axis of the flow limiting core 2 is 56°. The length of the sharp bevel structure of the flow limiting core 2 on the axis is L=D/tan α≈337.25 mm. The connecting line of the top end point H of the valve port inner edge and the near end point A of the inclined and inwardly recessed surface of the sharp bevel structure of the flow limiting core 2 is parallel to the axis of the flow limiting core 2, and the straight line connecting the end point I of the bottom of the circular valve port inner edge of the valve body 1 and the far end point B of the inclined and inwardly recessed surface of the sharp bevel structure of the flow limiting core 2 is parallel to the axis of the flow limiting core 2.

The symmetric central curve segment AGB is a circular arc, and the radius R satisfies: R=$L_{AB}$, where $L_{AB}$ is the length of the line segment AB;

the vertical plane cross section curve segment EGF is a circular arc, and the radius R of the circular arc satisfies: R=$L_{GH}$, wherein $L_{GH}$ is the length of the line segment HG.

In addition to the various advantages of the technical solution of the present application, the inclined and inwardly recessed surface design focuses on providing flow control water valves for flood discharge and irrigation that have targeted and beneficial effects such as having a diversion angle that facilitates the removal of fluid and sand and gravel debris impulsive force, and not interfered by rivers and pastoral debris and pressed down to close and saving energy.

The above are some embodiments of the technical solution of the present application, and the above embodiments are mainly for explaining the principle and some application methods of the technical solution of the present application. Actually the present application is not limited to the above embodiments, but as an innovative disclosure of basic technology, the anti-interference flow and pressure control device of the present application is not only suitable for flow control applications of miniature precision flow control components such as 3D printing equipment, laser/inkjet printers, minimally invasive surgical instruments, but also suitable for flow control of materials in industrial production equipment in industries such as printing and dyeing, spraying, injection molding, and the like, or flow control components in long-term closed scaling passages such as hydraulic transmission, fuel injection, gas/liquid purification pipelines and the like, and can also be applied to working conditions of large petrochemical or industrial and mining mechanical equipment such as crude oil/heavy oil/petrochemical product conveying, split charging and flow control, mineral powder split charging after crude ore ball milling and crushing, blast furnace coal powder injection and flow control, cement production raw material and finished product split charging and the like.

In a nano-level application scenario and even in a particle motion physics research experiment, besides the aforementioned purely mechanical structure flow control method, it is also possible to set force field obstacles or boosting methods to form a flow control valve port that can be opened or partially opened or completely closed based on the technical principles of the present application. The effective passage section of the flow control valve port has the largest inscribed circle radius value, and the flow control passage design with the smallest ratio of "the passage section area/ the inscribed circle radius" is a microcosmic anti-interference flow control technology solution with the highest value of the maximum outer diameter of a single particle or a particle which can pass through under the same flow parameters.

Figure 9:
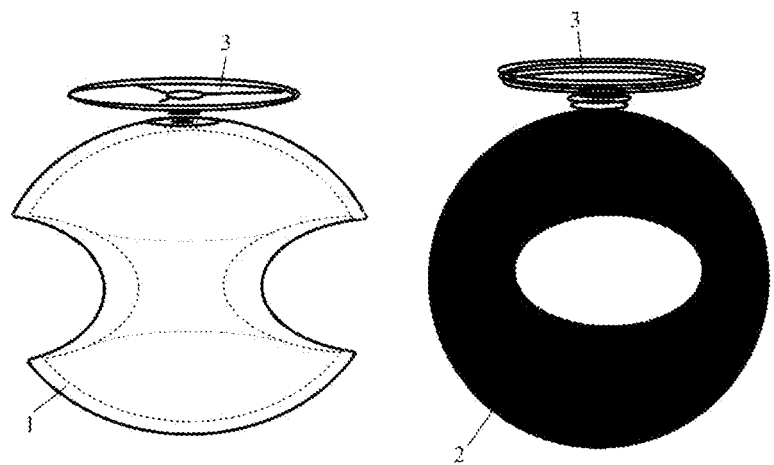
FIG. 9 is a schematic view of a ball valve according to the embodiment of the present application.

The embodiments of the present application may also be modified in the form of a ball valve. As shown in FIG. 9, a flow control ball valve includes a valve body 1, a flow limiting core 2 and an adjustment device 3;
  the valve body 1 is a spherical shell and is provided with a through shell passage with an elliptic cross section; the axis of the shell passage passes through the spherical center of the spherical shell;
  the flow limiting core 2 is a spherical core and is provided with a through core passage with an elliptic cross section; the axis of the core passage passes through the spherical center of the spherical core; the cross sections of the shell passage and the core passage are the same in shape and size, and an elliptic fluid passage can be formed; the major axis of the cross section of the elliptic fluid passage and the axis of the elliptic fluid passage form a reference plane; the adjustment device 3 can drive the flow limiting core 2 to rotate around a reference axis, which is an axis that passes through the center of the sphere and is perpendicular to the reference plane.

The vertical top and the horizontally symmetrical two sides of the valve body 1 are respectively provided with an opening. The flow limiting core 2 is tightly attached to the inner cavity of the valve body 1, and a horizontal passage is arranged in the flow limiting core 2. The rotary adjustment device is connected with the flow limiting core 2 through the top opening of the valve body 1 and can control the horizontal rotation of the flow limiting core 2 to rotate clockwise or anticlockwise. The adjustment device can be operated to ensure that the openings at the two ends of the horizontal passage in the flow limiting core 2 and the horizontally symmetrical openings at the two sides of the valve body 1 are completely matched in shape, size and position so as to form a maximum flow passage, and the angle of the flow limiting core 2 can also be rotated to ensure that the openings at the two ends of the horizontal passage in the flow limiting core 2 and the horizontally symmetrical openings at the two sides of the valve body 1 are synchronously shifted gradually in the horizontal direction until the openings at the two ends of the horizontal passage in the flow limiting core 2 are completely covered by the structure of the valve body 1.

The cross section of the horizontal passage in the flow limiting core 2 is elliptical, and the vertical projection of the curved surface where the edges of the opening at two ends of the horizontal passage in the flow limiting core 2 are located affected by the spherical surface is also an elliptical shape consistent with its cross section. As shown in FIG. 9, in the process of gradual dislocation of the double elliptical openings in the technical solution of the present application, the minimum flow control section inscribed circle radius is larger than that of the double half-moon shape of a conventional ball valve under the condition that the flow control section areas are the same.

In the technical solution of the application, the cross section ellipse of the elliptic fluid passage has the same shape as a reference ellipse;
  the reference ellipse satisfies the equation: $x^2/4+y^2=1$.

The operating section of the technical solution of the application is approximately circular or approximately elliptical or is a combination of a partially circular shape and a partially elliptical shape, so that in the case where the disclosure has the same pass-through section proportions as the prior art, the diameter of passing particles or impurities are at least 2-10 times, thereby reducing the interference of impurities and fouling on operation the device, and reducing wear and tear of the device. In the same principle, the special flow control operating surface design of the flow control core of the technical solution of this application can properly reduce the precision requirement of the manufacturing process of the devices, and at the same time, has lower requirements on the thermal coefficient and the abrasion resistance of the material of the key part, so that the manufacturing cost of the devices can be effectively reduced. Therefore, the application is an anti-interference flow control innovative technical solution which is wide in applicable industry, less in material limitation, low in manufacturing and operating cost and good in operation stability.

The above is only preferred embodiments of the present application, but the scope of the present application is not limited thereto, and any modification or substitution that can be easily conceived by those skilled in the art within the spirit and principle of the present disclosure shall be included in the protection scope of the present disclosure.

What is claimed is:

1. A flow and pressure control device, comprising:
  a valve body, comprising an outlet pipe, a transition cavity and an inlet pipe;
  a flow limiting core, completely inserted into the inlet pipe and blocking a fluid passage of the inlet pipe, wherein an inclined and inwardly recessed surface is provided at an end portion of the flow limiting core; and
  an adjustment device, configured to adjust the depth which the flow limiting core is inserted into the inlet pipe;
  wherein the inclined and inwardly recessed surface is symmetrical with respect to a first reference plane, which is a longitudinal symmetry plane of the valve body; the edge of the inclined and inwardly recessed surface and the first reference plane are intersected at a first reference point A and a second reference point B, wherein the first reference point A is the point in the inclined and inwardly recessed surface that last inserts into the inlet pipe, and the second reference point B is the point in the inclined and inwardly recessed surface that first inserts into the inlet pipe;
  an inner edge of an end face of the inner wall of the inlet pipe intersects with the first reference plane at a third reference point H and a fourth reference point I; the third reference point H can coincide with the first reference point A, and the fourth reference point I can coincide with the second reference point B;
  wherein an angle α between a line segment AB connecting the first reference point A and the second reference point B and the fluid flowing direction of the axis of the inlet pipe is greater than 0° and less than 90°;

an angle between a line HI connecting the third reference point H and the fourth reference point I and the fluid flowing direction of the axis of the inlet pipe is β, and 0°<β≤90°;

wherein a straight line on the first reference plane passing through the third reference point H and perpendicular to the line segment AB intersects with the inclined and inwardly recessed surface at a fifth reference point G;

the first reference plane and the inclined and inwardly recessed surface are intersected at a curve segment AGB, and the curve segment AGB is a concave curve;

a second reference plane which passes through the third reference point H and is perpendicular to the line segment AB intersects with the edge of the inclined and inwardly recessed surface at a sixth reference point E and a seventh reference point F; the second reference plane and the inclined and inwardly recessed surface are intersected at a curve segment EGF, and the curve segment EGF is a concave curve;

wherein the curved segment AGB is a circular arc;

when the angle α satisfies: 0°<α≤30°, the radius R of the curve segment AGB satisfies: R=D/(1−cos 2α), where D is the diameter of the flow limiting core;

when the angle α satisfies: 30°<α<90°, the radius R of the curve segment AGB satisfies: R=$L_{AB}$, where $L_{AB}$ is the length of the line segment AB.

2. The flow and pressure control device according to claim 1, wherein the curved segment AGB is a part of a parabola, and satisfies:

$$H_1 = D\left(1 - \sqrt{(L-L_1)/L}\right);$$

$H_1$ is the distance from the fifth reference point G to the straight line BI; D is the diameter of the flow limiting core; L is the length of the line segment AB projected in the axial direction of the flow limiting core, and $L_1$ is the distance of the second reference point B and the fifth reference point G projected in the axial direction of the flow limiting core.

3. The flow and pressure control device according to claim 1, wherein the curved segment EGF is an elliptical arc and is symmetrical about the major axis of the ellipse, satisfying the elliptic equation:

$$4x^2/D^2 + y^2/L_{GH}^2 = 1;$$

the plane where the elliptic equation is located is the second reference plane; the x axis of a rectangular coordinate system of the elliptic equation coincides with the straight line HG, and the coordinate origin coincides with the third reference point H; D is the diameter of the flow limiting core and $L_{GH}$ is the length of the line segment HG.

4. The flow and pressure control device according to claim 1, wherein the curved segment EGF is a circular arc having a radius R satisfying: R=$L_{GH}$, wherein $L_{GH}$ is the length of the line segment HG.

5. The flow and pressure control device according to claim 1, wherein the flow and pressure control device is a hot runner flow control valve of 3D printing equipment;

the curve segment AGB is a part of a parabola and satisfies:

$$H_1 = D\left(1 - \sqrt{(L-L_1)/L}\right);$$

$H_1$ is the distance from the fifth reference point G to the straight line BI; D is the diameter of the flow limiting core; L is the length of the line segment AB projected in the axial direction of the flow limiting core, and $L_1$ is the distance of the second reference point B and the fifth reference point G projected in the axial direction of the flow limiting core;

the curve segment EGF is an elliptic arc, satisfying the elliptic equation:

$$4x^2/D^2 + y^2/L_{GH}^2 = 1;$$

the plane where the ellipse equation is located is the second reference plane; the x axis of a rectangular coordinate system of the elliptic equation coincides with the straight line HG, and the coordinate origin coincides with the third reference point H; and $L_{GH}$ is the length of the line segment HG.

6. The flow and pressure control device according to claim 1, wherein the flow and pressure control device is a vehicle thermal gas turbine fuel flow control valve;

the curve segment AGB is a circular arc, and the radius R satisfies: R=D/(1−cos 2α), wherein D is the diameter of the flow limiting core;

the curve segment EGF is an elliptic arc, satisfying the elliptic equation:

$$4x^2/D^2 + y^2/L_{GH}^2 = 1;$$

the plane where the elliptic equation is located is the second reference plane; the x axis of a rectangular coordinate system of the elliptic equation coincides with the straight line HG, and the coordinate origin coincides with the third reference point H; $L_{GH}$ is the length of the line segment HG.

7. The flow and pressure control device according to claim 1, wherein the flow and pressure control device is a hydraulic device flow and pressure control valve;

the curve segment AGB is a circular arc, and the radius R satisfies: R=$L_{AB}$, where $L_{AB}$ is the length of the line segment AB;

the curve segment EGF is a circular arc, and the circular arc radius R satisfies: R=$L_{GH}$, wherein $L_{GH}$ is the length of the line segment HG.

8. The flow and pressure control device of claim 1, wherein the flow and pressure control device is an oil field and oil well flow and pressure control valve;

the curve segment AGB is a circular arc, and the radius R satisfies: R=$L_{AB}$, where $L_{AB}$ is the length of the line segment AB;

the curve segment EGF is an elliptic arc and, satisfying the elliptic equation:

$$4x^2/D^2 + y^2/L_{GH}^2 = 1;$$

the plane where the elliptic equation is located is the second reference plane; the x axis of a rectangular coordinate system of the elliptic equation coincides with the straight line HG, and the coordinate origin coincides with the third reference point H; D is the diameter of the flow limiting core and $L_{GH}$ is the length of the line segment HG.

9. The flow and pressure control device according to claim 1, wherein the flow and pressure control device is a crushed ore flow control funnel;

the curve segment AGB is a circular arc, and the radius R satisfies: $R=L_{AB}$, where $L_{AB}$ is the length of the line segment AB;

the curve segment EGF is an elliptic arc, satisfying the elliptic equation:

$$4x^2/D^2 + y^2/L_{GH}^2 = 1;$$

the plane where the elliptic equation is located is the second reference plane; the x axis of a rectangular coordinate system of the elliptic equation coincides with the straight line HG, and the coordinate origin coincides with the third reference point H; D is the diameter of the flow limiting core and $L_{GH}$ is the length of the line segment HG.

10. The flow and pressure control device according to claim 1, wherein the flow and pressure control device is a flow control water valve;

the curve segment AGB is a circular arc, and the radius R satisfies: $R=L_{AB}$, where $L_{AB}$ is the length of the line segment AB;

the curve segment EGF is a circular arc, and the circular arc radius R satisfies: $R=L_{GH}$, wherein $L_{GH}$ is the length of the line segment HG.

11. The flow and pressure control device according to claim 1, wherein the angle β is greater than 0° and less than 90°, and an end face of the inlet pipe is a planar elliptical ring, and the axis of the inlet pipe passes through the center of the elliptical ring.

12. The flow and pressure control device according to claim 1, wherein the angle β is greater than 0° and less than 90°, an end face of the inlet pipe is a concave elliptical ring, and the axis of the inlet pipe passes through the center of the elliptical ring.

13. The flow and pressure control device according to claim 12, wherein the shape of an inner concave surface where the concave elliptical ring is located is the same as that of the inclined and inwardly recessed surface, and the curved segment AGB is a portion of a parabola that satisfies:

$$H_1 = D\left(1 - \sqrt{(L-L_1)/L}\right);$$

$H_1$ is the distance from the fifth reference point G to the straight line BI; D is the diameter of the flow limiting core; L is the length of the line segment AB projected in the axial direction of the flow limiting core, and $L\_1$ is the distance of the second reference point B and the fifth reference point G projected in the axial direction of the flow limiting core;

the curve segment EGF is a circular arc, and the circular arc radius R satisfies: $R=L_{GH}$, wherein $L_{GH}$ is the length of the line segment HG.

14. The flow and pressure control device according to claim 1, wherein the inlet pipe has a circular cross section.

15. The flow and pressure control device according to claim 1, wherein the inlet pipe has an elliptical cross section.

* * * * *